April 29, 1958  E. L. WALLENHORST  2,832,553
CANOPY ACTUATING AND EJECTING ASSEMBLY
Filed Jan. 12, 1955  6 Sheets-Sheet 1

Edwin L. Wallenhorst
INVENTOR.

BY
ATTORNEY.

Edwin L. Wallenhorst
INVENTOR.

BY

ATTORNEY.

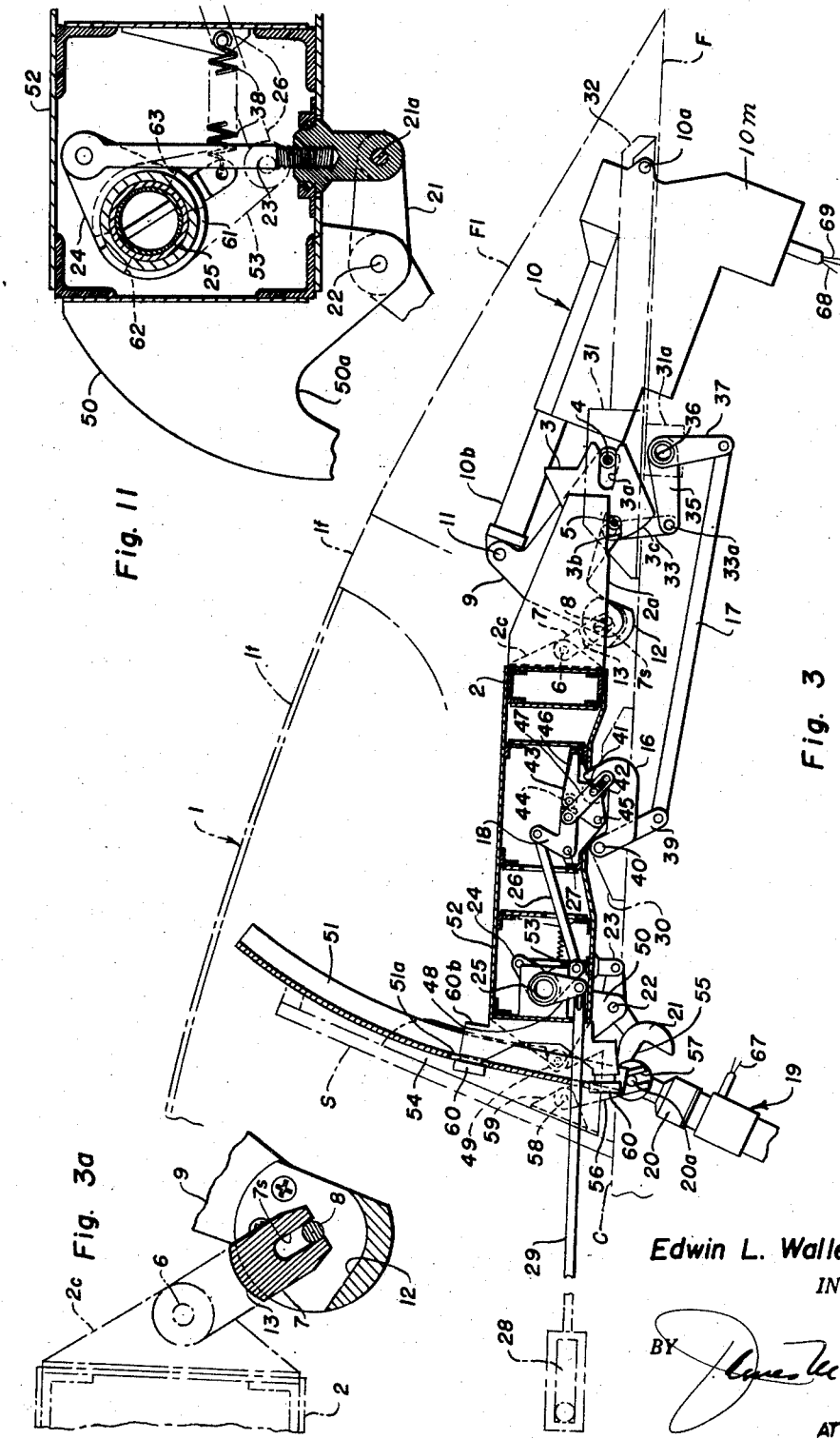

April 29, 1958  E. L. WALLENHORST  2,832,553
CANOPY ACTUATING AND EJECTING ASSEMBLY
Filed Jan. 12, 1955  6 Sheets-Sheet 4
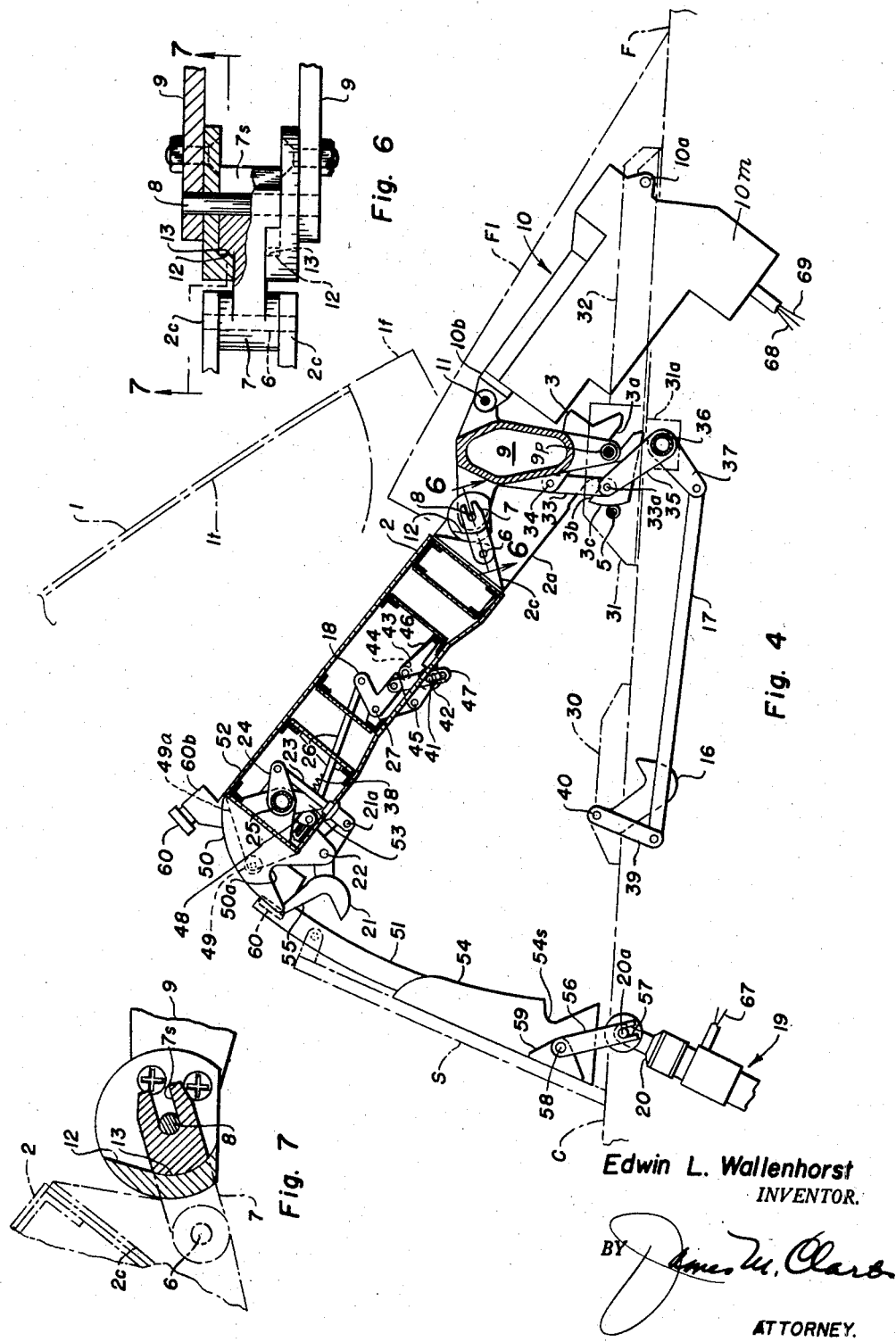
Edwin L. Wallenhorst
INVENTOR.
BY
ATTORNEY.

April 29, 1958 E. L. WALLENHORST 2,832,553
CANOPY ACTUATING AND EJECTING ASSEMBLY
Filed Jan. 12, 1955 6 Sheets-Sheet 5
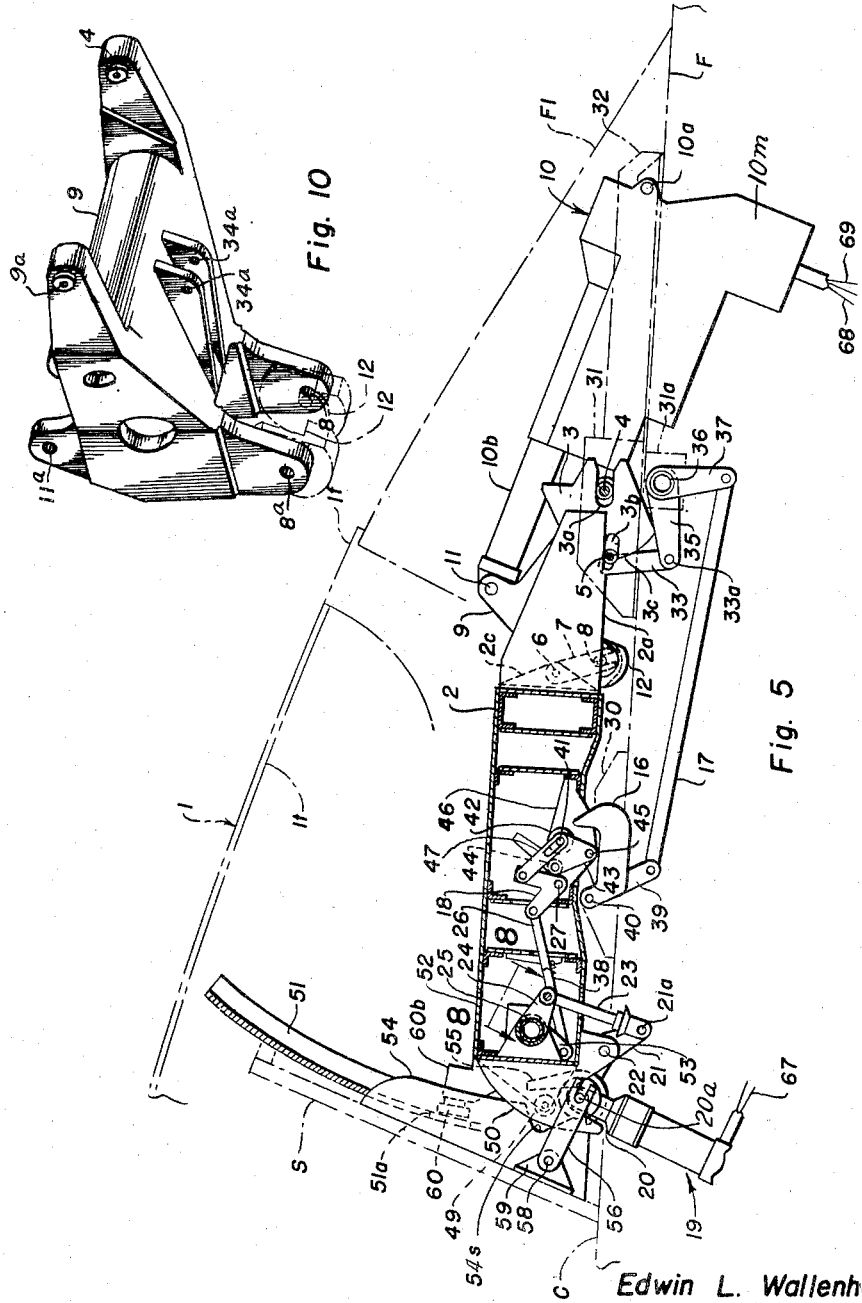
Edwin L. Wallenhorst
INVENTOR.
BY *James M. Clark*
ATTORNEY.

April 29, 1958     E. L. WALLENHORST     2,832,553
CANOPY ACTUATING AND EJECTING ASSEMBLY
Filed Jan. 12, 1955     6 Sheets-Sheet 6
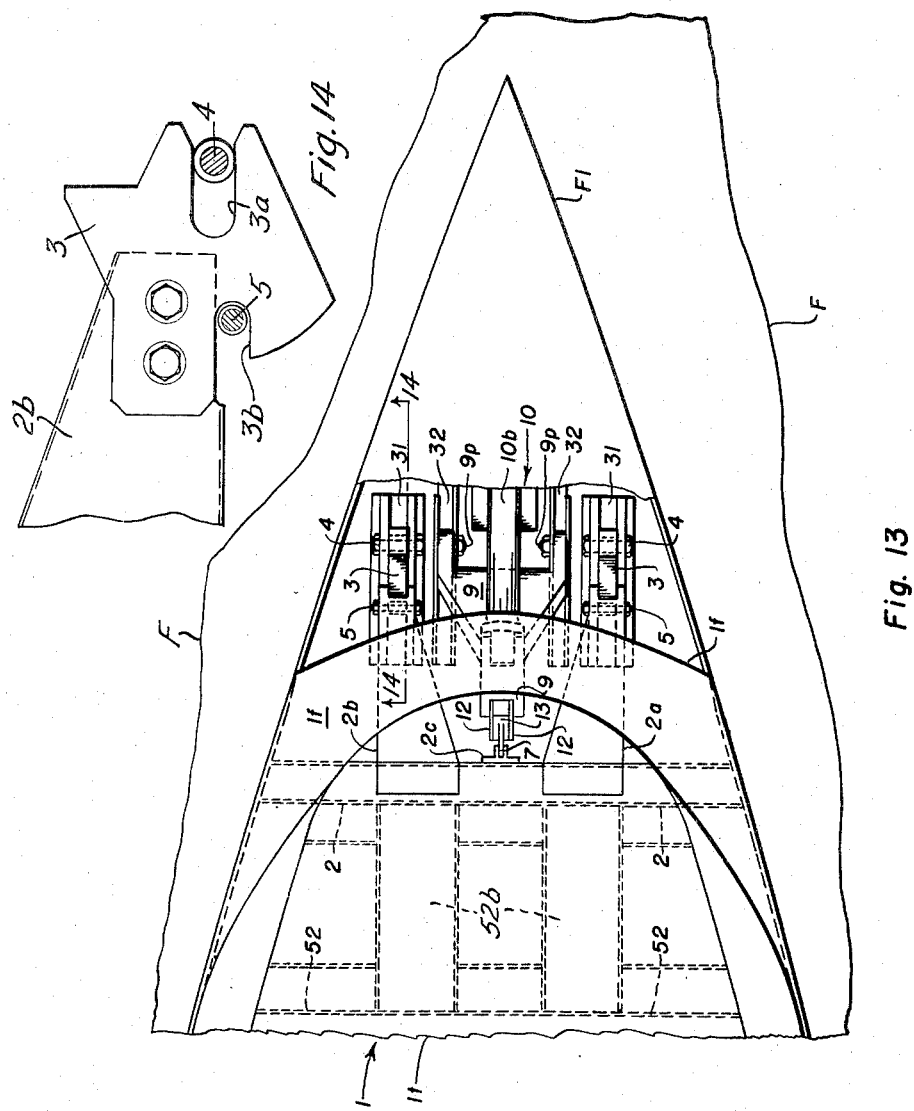
Edwin L. Wallenhorst
INVENTOR.
BY James M. Clark
ATTORNEY.

United States Patent Office 2,832,553
Patented Apr. 29, 1958

2,832,553

CANOPY ACTUATING AND EJECTING ASSEMBLY

Edwin L. Wallenhorst, Torrance, Calif., assignor to North American Aviation, Inc.

Application January 12, 1955, Serial No. 481,353

11 Claims. (Cl. 244—121)

The present invention relates to aircraft canopies or cockpit enclosures and more particularly to improvements in the actuating, ejecting and locking mechanisms therefor.

In the design of modern high speed aircraft, the installation and operation of the canopy or enclosure for the pilot's compartment represents an extremely important consideration. The speed with which a pilot may be required to evacuate a high speed aircraft in an emergency is such that powered methods are usually provided to eject the canopy and the pilot, as well as his seat and parachute, with as little delay as possible once such a situation arises. The element of time has grown to be such an important factor in these respects that the premature loss of a canopy or the jamming or delay in its release and ejection frequently means the loss of the life of the pilot or other occupant.

The present invention is directed to the provision of a light weight, simplified mechanism for actuating an aircraft canopy or enclosure which is positive and foolproof to insure its efficient and effective operation and use for maximum protection of the life of the pilot. The improved mechanism incorporates a novel powered actuator and pivotal mounting for the canopy which securely retains the canopy in its open and closed positions under normal conditions but which is readily released when jettisoned in an emergency. The improved installation and mechanism also embodies a unique locking arrangement whereby the canopy is retained upon the fuselage during normal flight operations but which is automatically unlatched by the power actuation for normal opening on the ground, or alternatively unlatched by the emergency ejection or jettisoning of the canopy in flight as well as by the manual release at any time when the power actuation is either not used or unavailable.

It is, accordingly, a major object of the present invention to provide an improved canopy installation for an aircraft wherein the canopy is capable of either normal power or manual actuation, or which is jettisonable by power or manually in an emergency. It is a further object to provide a canopy actuating and ejecting mechanism which is light in weight, simplified in construction and foolproof and positive in its operation. A further object of this invention is the provision of a canopy actuating assembly which may be automatically disengaged from the canopy in order that the canopy may be rapidly jettisoned in an emergency. A further objective is to provide a canopy actuating assembly which will open or raise and lower the canopy by pivotal movement from the rear of the canopy.

A still further object of this invention is the provision of a canopy actuating and ejecting assembly which is rapid and foolproof in its action and which will retain the canopy in any of a plurality of desired positions. A corollary objective of this invention is the provision of means for locking and latching the canopy securely to the fuselage in its closed position for the operation of the aircraft and means which will also securely hold the canopy in an open position.

These and other objects and advantages of the present invention will become apparent to those skilled in the art following a reading of the present description when taken in conjunction with the accompanying drawings, forming a part hereof, in which:

Fig. 3 is a more detailed side elevational view of the actuating and ejecting mechanism for the canopy shown in the above views, with the canopy shown in the closed and locked position;

Fig. 3a is a detail showing of the slotted lost-motion linkage between the canopy and the actuating mechanism;

Fig. 4 is a side elevational view of the canopy similar to Fig. 3 but with the canopy in the opened position;

Fig. 5 is a similar view of the same with the canopy in the closed, unlocked and partially released positions as it is about to be jettisoned in an emergency;

Fig. 6 is a plan view of the releasable connection shown in Fig. 3a;

Fig. 7 is a further view of the same in the engaged and opened position of the canopy as taken along the lines 7—7 of Fig. 6;

Fig. 10 is a perspective view of the rocking drive member intermediate the canopy and the actuating means;

Fig. 11 is a detailed elevational view of a portion of the emergency jettisoning unlatching mechanism including the mechanism shown in Fig. 8;

Fig. 12 is a perspective view of the releasable connecting drive arrangement between the powered actuator, the drive member and the canopy;

Fig. 13 is a plan view showing the structural connection of the canopy to the fuselage.

Fig. 14 is an enlarged side elevational view of a fragmentary portion of the canopy pivotal mounting showing the detailed structural relationship of the cam fitting and support bracket.

Figure 1:
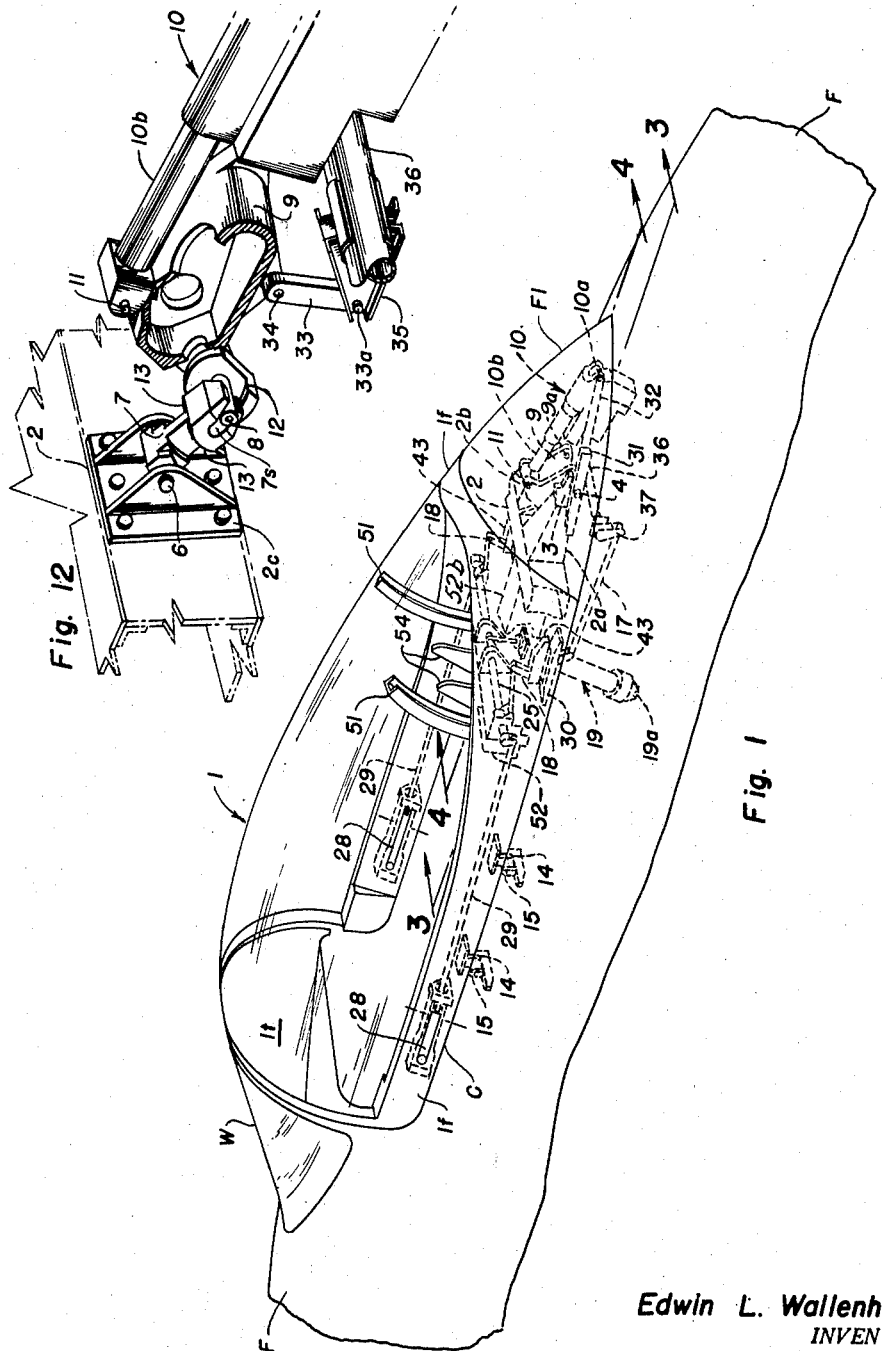
Fig. 1 is a perspective view of a portion of an aircraft fuselage showing a form of the improved canopy installation in conjunction therewith.
Figure 2:
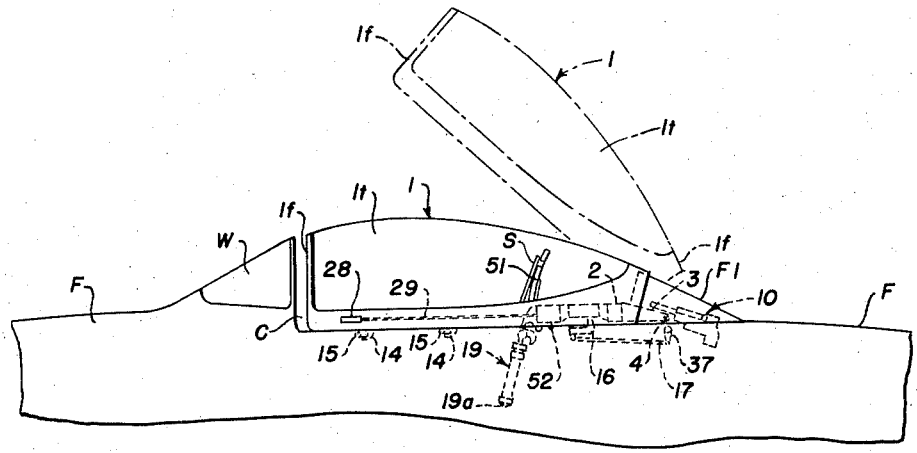
Fig. 2 is a side elevational view of the same showing the canopy in both the retracted and extended, or opened positions.

Referring now more particularly to Figs. 1 and 2, the letter F represents the fuselage of an aircraft within which there is a cockpit or pilot compartment C adapted to be covered or enclosed by the canopy 1. The forward portion of the cockpit is provided with a fixed transparent windshield portion W and a streamlined turtle-back or fairing portion F1 is provided aft of the canopy. The latter might be referred to as being of the clam-shell type in view of its pivotal mounting at the rear of the canopy and the cockpit although, as will hereinafter be more fully described, the canopy is also capable of limited longitudinal sliding or translation between its fully latched or locked, and its unlatched position. The canopy 1 is provided with a flush surface frame 1f to which its transparent member 1t is fixedly attached and all of which lie flush and form a streamlined continuation with the fuselage F, the windshield W and the fairing portion F1. The canopy 1 is also provided with a structural base frame at its aft portion which is fixedly attached to the external frame structure 1f and comprises the rear transverse beam 2 of box-type construction to which is secured the longitudinally extending beam member 52b terminating at its forward end at the transverse beam 52. Fixed to the rear face of the rear canopy cross beam 2 are the pivotal mounting slotted cam fittings 3, being supported from the beam 2 by the rearwardly extending bracket elements 2a and 2b. The latter are spaced apart in the lateral sense to permit a third bifurcated bracket 2c to be centrally mounted upon the rear face of the beam 2 between the longer brackets 2a and 2b. The bracket 2c pivotally supports the slotted link 7 to be more fully described below.

The mounting fittings 3 are each provided with a rearwardly opening slot 3a for engagement with the fixed pivot rollers or trunnions 4, and have forwardly opening slots 3b adapted for engagement with the fixed pivot rollers 5. The trunnions 4 and 5 are preferably formed by rollers rotatably mounted upon fixed pins laterally extending from, and supported by, the support fittings 31. The bracket fittings 2a and 2b, in cooperation with the fixed pivots 4 and 5 which are supported from the fixed channel supports 31 attached to the fuselage structure, see Fig. 13, comprise the improved pivotal mounting of the canopy. The slots 3a which face rearwardly are disposed, in the closed position of the canopy, slightly above the level of the forwardly facing slots 3b. The pins and rollers 4 and 5 are similarly spaced at slightly different levels, in the vertical sense, although the pivotal rollers 5 are appreciably farther forward than the pivot rollers 4. The slotted cam fittings 3 are preferably each identical and are separately attached to the aft portions of the laterally spaced brackets 2a and 2b. In these fittings 3, the mouths of the slots 3a facing rearwardly are tapered outwardly to permit the canopy and the attached fittings 3 to be separated readily from the pivot roller 4 when the canopy is jettisoned. The sides of the forwardly extending slots 3b are parallel but not coextensive since the lower side of each slot is shorter in length and meets the upper terminal portion of an arcuate cam surface 3c formed on the lower face of each fitting 3. Each cam surface 3c has for its center a point within the rear slot 3a approximately at the position of the axis of the pivot roller 4 when the canopy is moved aft to its most rearward position, as determined by the forward end of slot 3a engaging the roller 4. This may occur either prior to normal opening, or prior to jettisoning. In both of these operations, the canopy is moved to this aftmost position, slightly more rearwardly than the relationship shown in Fig. 5. After the canopy has been moved to its aftmost limit position, it is pivoted in the clockwise direction about the axis of the pivot rollers 4, as shown in Fig. 4, and in this position the pivot rollers 5 have left the mouths at the forward ends of the slots 3b; and as the canopy is opened and rotated about the axis of the pivot rollers 4, the pivot rollers 5 are engaged by the arcuate faces of the cams 3c.

The normal power actuation of the canopy between its closed and opened positions is accomplished in part by the rocking drive member 9 which is pivotally mounted upon the fuselage at a point located between the rollers 4 for movement about this pivot mount on pins 9p disposed on an axis which is shown to be in alignment with but could alternately be displaced somewhat to the rear of the axis of the fixed pivots 4 and carries at its forward and lower portion the pivot pins 8 which engage the releasable drive coupling assembly comprising the above-mentioned bracket 2c and the slotted link 7. The power actuator 10 is pivotally mounted upon the fixed aircraft structure at the pivot 10a upon a further fixed channel support 32 attached to the fuselage structure, and has an extensible portion 10b which is pivotally connected to an upper aft portion of the drive member 9 by means of the pivot 11. The drive member 9, shown in detail in the perspective view in Fig. 10, is generally T-shaped as viewed from the side and each of its apertured pivotal portions 9a, 8a and 11a are bifurcated by means of the laterally spaced projecting portions. It also is provided on its underside with a further pair of laterally spaced projecting web portions suitably apertured as at 34a for the pivot pin 34 for connection to the normal powered unlatching assembly which will be described further below. The actuator 10 has been illustrated as of the electric motor type, the motor 10m being powered and controlled through the wires 68 and 69 from a suitable power source 64 as will be hereinafter described in conjunction with Fig. 9. The electric actuator 10 is preferably of the nut and lead screw linear actuating type, but it will be understood that actuators of the hydraulic, mechanical or other types can also be satisfactorily used with the present mechanism. Contraction of the actuator 10, drawing the pivot 11 rearwardly toward the pivot 10a imparts clockwise rotation to the rocking drive member about the pivot 9a for the release of the latching mechanism 16, 42, the rearward translation of the canopy and the clockwise opening of the canopy. When the canopy is positioned in its forward latched position for use during flight conditions, the pivot rollers 5 are disposed at the aft end of the slots 3b and the pivot rollers 4 are disposed adjacent the mouths of the slots 3a at the aft ends. When the canopy is translated to its aftmost position, however, the pivot rollers 5 leave the shorter slots 3b and clear the same to permit pivotation of the canopy. It will, accordingly, be noted that the fitting members 3 in conjunction with the rearwardly extending brackets 2a and 2b provide the pivotal mounting for the canopy in conjunction with the fixed roller pivots 4 and 5, which mounting serves to hold the aft portion of the canopy down against the aircraft fuselage in the forwardly disposed and latched condition of the canopy. This provides for the rearward movement of the canopy for unlatching the same and the pivotal mounting also serves to permit clockwise normal rotation of the canopy to its fully opened position at which it is retained in engagement with the pivot rollers 4 by the cam faces 3c engaging the pivot rollers 5, beyond which position it may be rotated for jettisoning from the aircraft when the cam faces 3c no longer engage the pivot rollers 5.

Intermediate the rearwardly extending brackets 2a and 2b upon the rear face of the transverse beam 2, there is disposed, as stated above, the central bifurcated bracket 2c which is suitably apertured to receive the transverse pivot 6. Rotatably mounted upon the pivot 6 is the slotted link 7, the opposite terminal of which is slotted at 7s to engage the pin 8 carried by the rocking drive member 9. The latter is provided with an arcuate flanged portion 12, as shown in detail in Figs. 3a, 10 and 12, and the slotted terminal 7s of the link 7 is provided with an arcuate hub portion 13 adapted, under certain relationships, to engage the inner face of the arcuate flange 12 on the member 9. The slot 7s in the link 7, which is also shown in detail in Figs. 6 and 7, provides for a lost-motion connection between the canopy and the actuator 10 by means of which the rocking drive member 9 can be rotated beyond a dead-center position of the pivot 8 with respect to the pivots 4 and 6 without imparting forward movement to the canopy beyond its extreme forward locked condition shown in Fig. 3. This lost-motion feature of the slotted link 7 also permits rearward movement of the canopy from its forward locked position of Fig. 3, in an emergency during which it might either be manually operated by the pilot rotating the lever 28, or by the actuation of the gun jettisoning device 19.

The arcuate flange 12, in cooperation with the arcuate face 13 of the link terminal 7s, however, serves to prevent separation of the slotted link 7 from the rocking drive member 9 when it is desired that the canopy be lifted into its open position by the power actuator 10. As the rocking drive member 9 is rotated in the clockwise direction about the pivotal mounting 4 and the pivot 8 passes upwardly beyond the dead-center formed by the pivots 4 and 6, the opened end of the arcuate flange 12, as indicated in Fig. 3a, gradually approaches and embraces the outer arcuate face 13 of the slotted link 7 as shown in Fig.

7 in which the pivot 8 has passed well beyond the dead-center position. As the pivot 8 initially passes the dead-center line, the canopy is caused to be drawn rearwardly to its aftmost position at which the pivot rollers 5 are free of their slots 3b, and further as the rocking drive member 9 rotates beyond this position its lifting force is transferred to the face 13 of the link 7 by its arcuate flange 12, as shown in Fig. 7, and the canopy is rotated in the clockwise direction about the pivot 4 to the normal opened position shown in Fig. 4 which is the position to which the canopy would be opened while the aircraft is at rest upon the ground. In this normal opened position, the stem of the T-shaped drive member 9 has assumed a substantially vertical attitude above its pivot 4 and the pivot rollers 5 are in engagement with the cam surfaces 3c of the fittings 3 which prevent either fore or aft movement, or the separation, of the canopy from its pivotal mounting upon the fuselage.

The forward portion of the canopy is latched to the fuselage by the hooks 14 engaging the lock pins 15 attached to the aircraft structure as shown in Figs. 1 and 2. This takes place as the canopy is lowered under normal operation by the power actuator 10, and the pin 8 bears against the inner end of the slot 7s in the link 7 as the pin 8 passes downwardly past the dead-center position, thereby pushing the canopy forwardly so that the hooks 14 engage the lock pins 15, as shown in Fig. 1. The fittings 3 also move forwardly simultaneously along the pivot rollers 4 and 5 such that the latter move rearwardly within their respective slots 3a and 3b. In the forward locked condition of the canopy, the hooks 16 engage the rollers 42 as shown in Fig. 3, and rearward movement of the canopy is thereby prevented. Since the hooks and pins 14 and 15 prevent the canopy from being raised, all of this mechanism insures that the canopy is held firmly in place during normal flight. When it is desired to open the canopy upon the ground by power actuation of the unit 10, clockwise rotation of the rocking drive member 9 about the pivot axis extending through aperture 9a causes upward movement of the links 33, clockwise rotation of the torque shaft 36 and similar clockwise rotation of the hooks 16 to permit the rollers 42 to be moved rearwardly with the canopy as it is drawn to the rear by the member 9 and its lost-motion connection with the slotted link 7.

The normally operated unlatching mechanism accompanying power actuation for the opening of the canopy by the actuator 10, is accomplished by the pair of pivoted linkages interconnecting the rocking drive member 9 with the lock members 16 in engagement with the rollers 42, as shown in Fig. 3. As shown in Fig. 10, the underside of the drive member 9 is provided with a pair of fins having apertures 34a for a pivot pin 34 by which the member 9 is pivotally connected to the laterally spaced links 33. The opposite ends of the links 33 are pivotally connected by the pivots 33a to the lever arms 35 at the opposite ends of the torque shaft 36, which is transversely journalled for rotation within the fittings 31a carried by the fuselage structure. The outer terminals of the further lever arms 37, fixedly mounted upon the torque shaft 36, are pivotally attached to the forwardly extending links 17 which in turn are pivotally connected at their forward terminals to the depending lugs 39. The latter are in turn pivotally mounted at 40 upon the fuselage fittings 30 and fixedly carry the hook type lock members 16.

As indicated above, the pilot can operate the canopy mechanism manually by means of the handles 28, as shown in Fig. 1, disposed inside the canopy on each side and pivoted adjacent their rear edges to swing inwardly approximately 90°. This movement is transmitted through the slotted rods 29 to the arms or bellcranks 48 on the outer ends of the torque shaft 25, which is normally biased by the spring 38 to move clockwise, but is now caused to rotate in the counterclockwise direction by the rods 29. The lever arm fittings 53 on the torque shaft 25 are thereby rotated, and being connected to the links 26 attached to the upwardly extending arms of the stop members 18, as shown in Fig. 1, cause the latter to rotate about their pivots 27 in the counterclockwise direction to disengage from the rollers 44 carried on the pivoted elements 43. Rollers 44 act as stops to limit the clockwise movement of member 18 and thereby also prevent movement of the attached linkage beyond an optimum position. By making these stops 44 in the form of rollers acting on the cam-like end of member 18 friction therebetween is decreased. Continuing application of pressure rearwardly on the handles 28 results in the rollers 42 completely disengaging from the locks 16, as the elements 43 move about their pivot 45 carried by the flanged fitting 46 which is fixedly mounted from longitudinally extending beam member 52b. An offset is provided between the pivotal mounting of the member 43 at the pivot 45 and the axis of the pivotal attachment 41 of the roller 42 which sets up a couple upon rearward movement of the canopy which forces the latch 43 to pivot about 45. A slotted link 47 connects member 18 and pivot 41 to provide a positive action, permitting initial movement of stop 18 pivoting about 27 to clear roller 44, at which point the link 47 draws the member 43 upwardly, causing it to pivot about 45 and disengage roller 42 from lock 16. The retaining hooks 14 are disengaged as the canopy moves aft upon disengagement of the locks 16 in response to movement of rods 29. Initially, movement of one or both handles 28 imparts the foregoing motion to rods 29, but after swinging inwardly 90° each handle 28 contacts a stop and all further rearward pull on the handle is applied directly to moving the canopy aft. When this is done in an emergency during flight, the forces created by the airstream exerted against the canopy will cause its removal from the fuselage. Inasmuch as such canopies weigh on the average about one hundred and thirty pounds, the pilot can lift the same in an emergency on the ground, allowing it to pivot about the pivot rollers 4 at the rear end of the canopy pivotal support until it topples backwards off the aircraft. In addition to the two inner handles 28, it is also desirable to provide a similar flush type handle on at least one side of the canopy on the outside to facilitate its opening and closing from the exterior.

Figure 8:
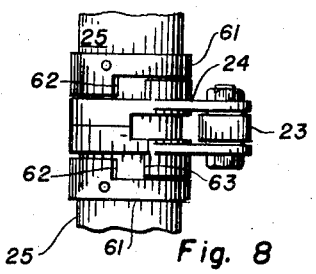
Fig. 8 is a detail view of a portion of the lost-motion mechanism of the emergency jettisoning unlatching mechanism.

With the canopy in its closed and locked forwardly disposed position, it can be jettisoned during flight by the firing of the emergency jettisoning gun 19. Before describing the operation under these conditions, it might be well to refer back to the detail of the fittings 3 and the slotted attachment to the rollers 4 and 5 to describe how this structure prevents detachment of the canopy from the fuselage under normal conditions whenever the canopy is opened. As may be seen in Fig. 4, the cam faces 3c bear on the rollers 5 and these prevent shifting or displacement of the fittings 3 in an upward direction such as would move the slots 3a off of the rollers 4. The arrangement is such, however, that when the canopy is in process of being jettisoned and is rotated farther in the clockwise direction than the position shown in Fig. 4, the cam faces 3c are free to rotate upwardly beyond the fixed pivot rollers 5 and in such case the canopy is readily lifted by the airstream from its support on the pivot rollers 4 with the open slots 3a sliding off of these rollers. At the same time and under these emergency conditions, the rocking driving member 9 will remain in the position in which it is shown in Fig. 3 since the motor 10 is not used for jettisoning. Again and at the same time a separation occurs between link 7 and pivot pin 8 since in this relative position of the parts, the arcuate flange 12 on the member 9 does not lie in the path of shoulder 13 of link 7. This may be seen in the larger detail of Fig. 12 although in Fig. 5 the parts are actually in the relative positions at which the actual separation occurs. To reach the position of Fig. 5, the jettisoning operation must have been initiated by firing of the gun 19, with concomitant rearward shifting of the canopy. To permit this operation, the gun 19 is pivotally mounted at its lower terminal to the aircraft fuselage by means of the pivot 19a and is activated by the closing of an electrical switch 65 disposed convenient to the pilot. Closing of the switch 65 causes rapid upward movement of the piston or head portion 20 of the jettisoning gun, the latter having a pivotal pin terminal 20a disposed within the slot 57 in the depending link 56, which is pivotally mounted by the pivot 58 to the bracket 59 supported from the fixed structure S disposed at the back of the pilot's seat. The effect of the link 56 upon firing of the gun 19 and upward movement of the pin 20a is to cause both the head of the jettisoning gun and the canopy, through the slotted pivot link 21, to move rearwardly for its unlatching from the fuselage and its conditioning for jettisoning. The gun head pin 20a is also in engagement with the projecting portion 55 of the link 21, which is pivotally mounted upon the fitting 50 attached to the forward face of the canopy cross beam member 52, the member 21 being pivoted thereto at the pivot 22. The head 20 of the gun also engages the converging slot 50a, as shown in Fig. 4, in the bracket 50. The slotted link or bellcrank 21 is pivotally connected to the vertically disposed link 23 which in turn is pivotally connected at its upper terminal to the arm 24 rotatably mounted upon the transverse torque shaft 25. Lost-motion is provided in this linkage, as shown in Figs. 8 and 11, through the bellcrank 24, rotatably mounted on the torque shaft 25, and the collar or sleeve 61 pinned to the shaft 25. Interengaging shoulders 62 and 63 are provided on collar 61 and bellcrank fitting 24, respectively.

It will, accordingly, be noted that upward movement of the pin 20a, bearing against the recessed terminal of the bellcrank 21, causes initial rotation of the same about the pivot 22, and subsequently rearward translation for the unlatching of the canopy. The clockwise rotation imparted to the bellcrank 21 imparts similar clockwise rotation to the torque shaft 25, and to the intermediate link 23 in the arm 24, thereby withdrawing the detent 18 from its blocking position against the roller 44 by drawing the link 26 forwardly. This permits drawing the blocking rollers 42 upwardly through the action of the link 47 the slot in which engages the pin 41 for the rollers 42, thereby unlatching the canopy from its engagement with the hook member 16 and permitting its subsequent rearward unlatching movement. For the guidance of the canopy as it is moved upwardly about the pivot rollers 4, there is provided a pair of upwardly extending arcuate tracks 51 disposed on the opposite sides of a pair of guide plates 54. A pair of rollers 60 is pivotally mounted upon each of two bracket portions 60b attached to the forward face of the canopy structure 52, and in the normal closed and latched position of the canopy the rollers 60 extend forwardly through openings 51a in the web portions of the respective rails 51. There are also disposed at the rear of the structure S a pair of guide plates or rails 54 having rearwardly and downwardly facing slots 54s engageable by the rollers 49 pivoted on the brackets 49a in the forward latched normal flight position of the canopy. As the canopy is moved rearwardly into its unlatched position from which it can either be opened or jettisoned, the rollers 60 emerge from the apertures 51a to engage the flanges of the channel rails 51 for guiding the canopy as it moves upwardly. Fig. 5 shows the start of the jettisoning operation in which the pin 20a at the head of the gun 19 has moved upwardly and rearwardly in an initial stage of its travel in which it has been pushed rearwardly by the link 56; and also has in turn pushed the canopy rearwardly almost to its full rearward position at which the pivot rollers 5 will emerge from the slots 3b and permit pivotation about the pivot rollers 4 to a point beyond the angle at which the cam faces 3c will continue to engage the pivot rollers 5. Beyond this point lifting of the canopy is permitted completely from the fuselage, the hooks 14 having previously been disengaged from the locking pins 15, the rollers 60 being free to emerge from the opened upper ends of the channel tracks 51 and the pin 8 being permitted to leave the opened slotted end of the link 7.

Figure 9:
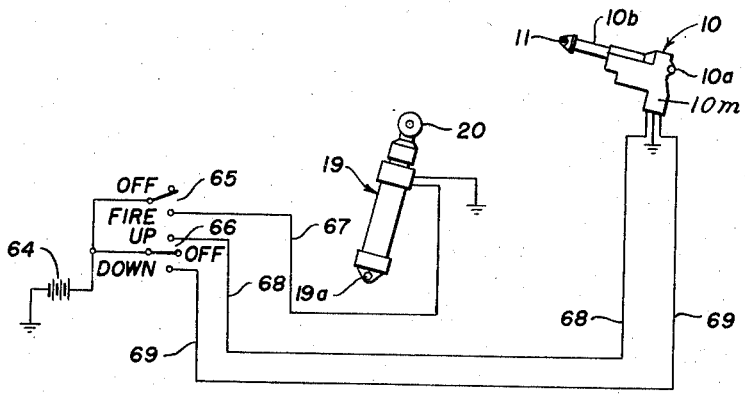
Fig. 9 is a diagrammatic view of the electrical circuit for the control of the normal actuating and emergency ejecting means.

Fig. 9 shows a diagrammatic wiring diagram for the selective operation of the canopy, either for normal opening or closing by means of the electrically actuated motor 10, or the emergency actuation by the jettisoning gun 19. The power may be supplied by a suitable source of electrical energy such as the battery 64 and the emergency jettisoning controlled by the switch 65 to the lead 67, and the return connection to ground. The reversible motor 10m of the actuator 10 may be controlled by the double throw switch 66 through the leads 68 and 69 by means of which the canopy can either be raised upwardly or lowered downwardly by the respective direction of rotation of the motor powering the actuator 10.

Other forms and modifications of the present invention, both with respect to its general arrangement and the details of its respective parts, which may occur to those skilled in the art after reading the foregoing description, are intended to come within the scope and spirit of this invention as more particularly set forth in the appended claims.

I claim:

1. A pivotal mounting for a canopy operatively associated with an aircraft cockpit in which a canopy is mounted for movement consisting of a first phase unlatching sequence comprising sliding translation followed by a second phase pivotal opening movement, comprising spaced pivot means carried by said cockpit, a forwardly opening slot carried by said canopy in engagement with a first of said pivot means, and a rearwardly opening slot formed by said canopy engaging a second of said pivot means, said slots being arranged to permit shifting of said canopy with respect to said cockpit while said slots are in engagement with both said pivot means whereby said canopy is prevented from separation from said cockpit in a first position of said canopy and in a further position said canopy is permitted to be rotated about one of said pivot means.

2. In a pivotal mounting for a canopy operatively associated with an aircraft cockpit, latching and mounting means comprising a cockpit, a canopy mounted to normally enclose the cockpit, spaced pivot means carried by said cockpit, support structure attached to said canopy having therein a forwardly opening slot adapted for engagement with a first of said pivot means, and a rearwardly opening slot formed by said canopy engaging a second of said pivot means, said slots being arranged to permit shifting of said canopy with respect to said cockpit while said slots are in engagement with said pivot means whereby said canopy is prevented from pivotal movement with respect to said cockpit in a first of said shifted positions of said canopy when both of said slots are engaged by said pivot means and in a further shifted position in which one of said pivot means becomes disengaged from its respective slot said canopy is permitted to be rotated about the other of said pivot means.

3. A pivotal mounting for a canopy operatively associated with an aircraft cockpit, comprising a cockpit, a canopy mounted to normally enclose the cockpit, spaced pivot means carried by said cockpit, support structure attached to said canopy having therein a forwardly opening slot adapted for engagement with a first of said pivot means, a rearwardly opening slot formed in another portion of said canopy support structure engaging a second of said pivot means, and cam means carried by said canopy adjacent one of said slots, said slots being arranged to permit shifting of said canopy with respect to said cockpit while said slots are in engagement with said pivot means whereby said canopy is prevented from pivotal movement with respect to said cockpit in a first of said shifted positions of said canopy when both of said slots are engaged by said pivot means, and in a further shifted position in which one of said pivot means becomes disengaged from its respective slots said canopy is permitted to be rotated through a limited angle about the other of said pivot means during which rotation separation of said canopy from said cockpit is prevented by said cam means engaging said first pivot means.

4. A pivotal mounting for a canopy operatively associated with an aircraft cockpit, comprising a cockpit, a canopy mounted to normally enclose the cockpit, spaced pivot means carried by said cockpit, support structure attached to said canopy having therein a forwardly opening slot adapted for engagement with a first of said pivot means, a rearwardly opening slot formed in another portion of said canopy support structure engaging a second of said pivot means, and cam means carried by said canopy adjacent one of said slots, said slots being arranged to permit shifting of said canopy with respect to said cockpit while said slots are in engagement with said pivot means whereby said canopy is prevented from pivotal movement with respect to said cockpit in a first of said shifted positions of said canopy when both of said slots are engaged by said pivot means and in a further shifted position in which one of said pivot means becomes disengaged from its respective slots said canopy is permitted to be rotated through a limited angle about the other of said pivot means during which rotation separation of said canopy from said cockpit is prevented by said cam means engaging said first pivot means, and rotation beyond a predetermined angle at which said cam means becomes disengaged from said first pivot means permits separation of said canopy from said aircraft cockpit by disengagement of said rearwardly opening slot from said second pivot means.

5. In an aircraft, a cockpit, a canopy mounted for pivotal movement with respect to said aircraft cockpit, trunnion means carried by said aircraft, a rearwardly opening slot formed in said canopy in engagement with said trunnion means, roller means mounted upon a transverse axis on said aircraft spaced from said trunnion means, a forwardly opening slot formed in said canopy in engagement with said roller means, a rockable member, a rockable member pivot pin mounted on said aircraft and operatively connected to said rockable member to form a pivotal connection therebetween, an actuator pivotally connected to said rockable member for selectively rocking the same about said pivotal connection, and link means pivotally mounted upon said canopy at a first terminal and having an opposite slotted terminal in engagement with a pivot carried by said rockable member, said rockable member having a detent portion disposed about said rockable member pivot pin arranged such that initial rotation of said rockable member by said actuator imparts rearward translatory movement of said canopy with respect to the aircraft cockpit for the disengagement of said roller means from said forwardly facing slot, and continued rotation of said rockable member by said actuator imparts positive lifting by said rockable member through said slotted link means and said rockable member pivot pin for the pivotation of said canopy about said trunnion means.

6. In an aircraft having a cockpit, a canopy mounted for both fore and aft translatory and pivotal movement with respect to said cockpit, transversely extending trunnion means carried by said aircraft adjacent the rear of said canopy, a rearwardly opening slot formed in said canopy in engagement with said trunnion means, roller means mounted upon a transverse axis on said aircraft disposed forward of said trunnion means, a forwardly opening slot formed in said canopy in engagement with said roller means, a rockable member operatively mounted upon the aircraft to form a pivotal connection therebetween in the region of said trunnion means, said rockable member having a projecting pivot pin, an actuator pivotally connected to said rocking member for selective rocking of the same about said pivotal connection, link means pivotally mounted upon said canopy at a first terminal and having an opposite slotted terminal in engagement with said pivot pin carried by said rockable member, said slotted link means having an enlarged terminal hub portion formed adjacent said slotted terminal, hook engaging means mounted on said canopy, and hook means pivotally mounted on said aircraft for operatively contacting said hook engaging means for opposing rearward translation of said canopy, said rockable member having a detent portion arcuately disposed about said rockable member pivot pin arranged such that initial rotation of said rockable member by said actuator removes said hook means from the path of said canopy and imparts rearward translatory movement of said canopy with respect to the aircraft cockpit for the disengagement of said roller means from said forwardly facing slot and continued rotation of said rockable member by said actuator is accompanied by positive lifting transmitted from said rockable member through said arcuate detent portion about said rockable member pivot pin for the pivotation of said canopy about said trunnion means.

7. In an aircraft having a cockpit, a canopy mounted for both fore and aft translatory and pivotal movement with respect to said cockpit, transversely extending trunnion means carried by said aircraft adjacent the rear of said canopy, a rearwardly opening slot formed in said canopy in engagement with said trunnion means, roller means mounted upon a transverse axis on said aircraft disposed forward of said trunnion means, a forwardly opening slot formed in said canopy in engagement with said roller means, a rockable member operatively mounted upon the aircraft to form a pivotal connection therebetween in the region of said trunnion means, said rockable member having a projecting pivot pin, an actuator pivotally connected to said rocking member for selectively rocking the same about said pivotal connection, link means pivotally mounted upon said canopy at a first terminal and having an opposite slotted terminal in engagement with said pivot pin carried by said rockable member, said slotted link means having an enlarged terminal hub portion formed adjacent said slotted terminal, hook engaging means mounted on said canopy, hook means pivotally mounted on said aircraft for operatively contacting said hook engaging means for opposing rearward translation of said canopy, said rockable member having a detent portion arcuately disposed about said rockable member pivot pin arranged such that initial rotation of said rockable member by said actuator removes said hook means from the path of said canopy and imparts rearward translatory movement of said canopy with respect to the aircraft cockpit for the disengagement of said roller means from said forwardly facing slot and continued rotation of said rockable member by said actuator is accompanied by positive lifting transmitted from said rockable member through said arcuate detent portion about said rockable member pivot pin for the pivotation of said canopy about said trunnion means, and manually operated means operatively connected to said hook means for the release of said hook means to permit manual shifting of said canopy to said aftmost position at which said canopy is partially rotated to an open position about the axis of said trunnion means and disengagement of said canopy from said actuating means is permitted by the open slotted terminal of said link means.

8. In an aircraft having a cockpit, a canopy mounted for both fore and aft translatory and pivotal movement with respect to said cockpit, transversely extending trunnion means carried by said aircraft adjacent the rear of said canopy, a rearwardly opening slot formed in said canopy in engagement with said trunnion means, roller means mounted upon a transverse axis on said aircraft disposed forward of said trunnion means, a forwardly opening slot formed in said canopy in engagement with said roller means, a rockable member operatively mounted upon the aircraft to form a pivotal connection therebetween in the region of said trunnion means, said rockable member having a projecting pivot pin, an actuator pivotally connected to said rocking member for selectively rocking the same about said pivotal connection, link means pivotally mounted upon said canopy at a first terminal and having an opposite slotted terminal in engagement with said pivot pin carried by said rockable member, said slotted link means having an enlarged terminal hub portion formed adjacent said slotted terminal, hook engaging means mounted on said canopy, hook means pivotally mounted on said aircraft for operatively contacting said hook engaging means for opposing rearward translation of said canopy, said rockable member having a detent portion arcuately disposed about said rockable member pivot pin arranged such that initial rotation of said rockable member by said actuator removes said hook means from the path of said canopy and imparts rearward translatory movement of said canopy with respect to the aircraft cockpit for the disengagement of said roller means from said forwardly facing slot and continued rotation of said rockable member by said actuator is accompanied by positive lifting transmitted from said rockable member through said arcuate detent portion about said rockable member pivot pin for the pivotation of said canopy about said trunnion means, manually operated means operatively connected to said hook means to permit manual shifting of said canopy to said aftmost position at which said canopy is partially rotated to an open position about the axis of said trunnion means and disengagement of said canopy from said actuating means is permitted by the open slotted terminal of said link means and further linkage means pivotally mounted upon said canopy and operatively associated with said hook means, an ejection gun operatively supported upon the aircraft and in engagement with said further linkage means whereby actuation of said ejection gun actuates said further linkage means for the release of said hook means, said ejection gun imparts rearward translation to said canopy with respect to said aircraft cockpit opening and pivotation of said canopy about said trunnion means to a position at which said canopy is completely separated from said aircraft by disengagement of the open slotted portion of said canopy from said trunnion means.

9. In an aircraft cockpit canopy installation including a fuselage having a cockpit opening therein, a movable cockpit canopy for said cockpit opening, track means formed on said cockpit opening for sliding engagement by said canopy between fore and aft positions, latch means associated with a forward portion of said canopy and said cockpit opening adapted to prevent vertical separation of said canopy from said cockpit in the forward position of said canopy and to permit such separation in a rearward position of said canopy, mounting means operatively associated with a rear portion of said canopy and said cockpit opening arranged to prevent vertical separation of said canopy from said cockpit opening in the forward position of said canopy and to permit pivotation of said canopy about said mounting means in a rearward position of said canopy, a link pivotally mounted at a first terminal upon said canopy and having an open slot at its opposite terminal, said slotted terminal of said link having an enlarged arcuately spaced engagement portion, power actuating means pivotally mounted upon the aircraft and having pin means in engagement with the slotted terminal of said link, hook engaging means mounted on said canopy, hook means pivotally mounted on said aircraft for operatively contacting said hook engaging means for releasably retaining said canopy in said forward position and blocking translation toward said aft position, linkage means operatively connecting said power actuating means with said hook means for releasing said hook means upon initial opening movement of said actuating means, and an arcuate detent portion carried by said power actuating means engageable with the enlarged arcuate engagement portion of said slotted link whereby upon further movement of said actuating means rearward shifting is imparted to said canopy and subsequent pivotal opening of said canopy is effected upon further movement of said actuating means.

10. In aircraft, a canopy mounted upon the aircraft structure for translatory fore and aft latching and pivotal opening and closing movements with respect to the aircraft, latching means associated with said canopy and the aircraft adapted to latch said canopy to the aircraft in a forward position within the range of fore and aft movement of said canopy, mounting means including spaced pivots carried by the aircraft and spaced slots formed within said canopy adapted to receive respective ones of said spaced pivots for preventing separation of said canopy from the aircraft within the range of unlatching and normal pivotal movement of said canopy, said mounting means permitting rotation of said canopy about one of said pivots in the aftmost position of said canopy when said canopy is disengaged from said latching means, the said mounting means including an arcuate cam surface adapted to bear on one of said pivots when the same is disengaged from its respective slot throughout the range of normal pivotal movement to prevent movement of the other of said pivots out of its slot while permitting separation of said canopy from the aircraft upon pivotation of said canopy beyond a predetermined angle corresponding to the effective range of normal pivotal movement of said arcuate cam surface on said one pivot, and power means connected to react between said mounting means and the structure of said aircraft for imparting said translatory and pivotal movements to said canopy.

11. In combination, an aircraft and a canopy actuating and latching assembly therefor comprising a canopy mounted on the aircraft for pivotal opening and closing movement, an actuator releasably connected to the canopy adapted to drive the canopy through a normal range of angular opening movement preceded by a limited range of translational unlatching movement, mounting means including a first set of spaced pins and a second set of spaced pins carried by the aircraft, mounting arm structure attached to the canopy having spaced slots adapted for engagement with respective ones of said first set of spaced pins and said second set of spaced pins, the said slots being arranged horizontally in parallelism with each other to permit a limited fore and aft movement of the canopy and disengagement of the first set of spaced pins from their slots in the rearmost position of the canopy whereby the canopy is free to rotate about the second set of spaced pins, means formed on the mounting arm structure adapted to engage the disengaged first set of spaced pins, said first set of spaced pins being effective only during the normal range of pivotal movement of the canopy to prevent upward movement of the canopy away from said second set of spaced pins, and a second actuator operatively connected to said aircraft and to said canopy to actuate the canopy, the said second actuator having an operational range greater than that of the first actuator whereby it can rotate the canopy beyond the range of effectiveness of said first set of spaced pins and the canopy may move upwardly away from the second set of spaced pins.

References Cited in the file of this patent

UNITED STATES PATENTS

| 2,479,713 | Beach | Aug. 23, 1949 |
| 2,607,551 | Clark et al. | Aug. 10, 1952 |
| 2,673,050 | Patch et al. | Mar. 23, 1954 |

FOREIGN PATENTS

| 623,891 | Great Britain | May 24, 1949 |
| 671,540 | Germany | Feb. 9, 1939 |